US008279457B2

(12) United States Patent
Hopper et al.

(10) Patent No.: US 8,279,457 B2
(45) Date of Patent: Oct. 2, 2012

(54) GENERATING USER DEFINED MARKING SETTINGS TO PRINT MARKS TO CONTROL POST-PROCESSING DEVICES

(75) Inventors: Samuel Neely Hopper, Longmont, CO (US); Ronald Dean Parrish, Tucson, AZ (US); David Ward, Broomfield, CO (US); Kent S. Norgren, Louisville, CO (US); Ronald Earl Van Buskirk, II, Tucson, AZ (US); Kenneth Stuart Shouldice, Boulder, CO (US); Brian Charles Pendleton, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 1473 days.

(21) Appl. No.: 11/228,075

(22) Filed: Sep. 16, 2005

(65) Prior Publication Data

US 2007/0076234 A1      Apr. 5, 2007

(51) Int. Cl.
    *G06K 15/00*      (2006.01)
(52) U.S. Cl. .................... 358/1.12; 358/1.13; 358/1.1
(58) Field of Classification Search ............... 358/1.1, 358/1.15, 1.12, 1.13, 448
    See application file for complete search history.

(56) References Cited

U.S. PATENT DOCUMENTS

| | | | |
|---|---|---|---|
| 5,631,747 A * | 5/1997 | Farrell et al. ................. 358/448 |
| 6,396,594 B1 | 5/2002 | French et al. | |
| 6,809,841 B2 | 10/2004 | Brewster | |
| 7,190,467 B2 * | 3/2007 | Simpson et al. .............. 358/1.1 |
| 2002/0093684 A1 | 7/2002 | Bares et al. | |

FOREIGN PATENT DOCUMENTS

| | | | |
|---|---|---|---|
| JP | 06155851 | * | 3/1994 |
| JP | 06-155851 A | | 6/1994 |
| JP | 06155851 | * | 6/1994 |
| JP | 09-222718 A | | 8/1997 |
| JP | 2002-273971 A | | 9/2002 |
| JP | 2004-202852 A | | 7/2004 |

OTHER PUBLICATIONS

Nakayama Masayuki, Jun. 1994, Japan, English translation.*
Nakayama Masayuki, Printer, Mar. 6, 1994, English translation.*
English translation of JP06155851.*
L.C. Lahey, et al., "Technique for Inserting Tab Pages into Print-on-Demand System Advanced Function Printing Printer", IBM Corporation, Technical Disclosure Bulletin, vol. 38,No. 10, Oct. 1995, pp. 201-202.

* cited by examiner

*Primary Examiner* — King Poon
*Assistant Examiner* — Iriana Cruz
(74) *Attorney, Agent, or Firm* — Blakely, Sokoloff, Taylor & Zafman LLP

(57) ABSTRACT

Provided are a method, system, and program generating user defined marking settings to print marks to control post-processing devices. A user interface is generated to enable user input to define at least one marking setting comprising a name of the marking setting, a dimension of a marking, and a location of the marking on the print medium. Marking settings control a printer to output markings on a print medium. The outputted markings on the print medium control at least one post processor device to perform post processing operations on the print medium. User input is received from the user interface defining at least one marking setting. The user defined at least one marking setting is stored with an existing set of marking settings to control the printer.

10 Claims, 4 Drawing Sheets

Marking Setting

GENERATING USER DEFINED MARKING SETTINGS TO PRINT MARKS TO CONTROL POST-PROCESSING DEVICES

BACKGROUND OF THE INVENTION

1. Field of the Invention

The present invention relates to a method, system, and program for generating user defined marking settings to print marks to control post-processing devices.

2. Description of the Related Art

A user may specify that a print job include markings to control post-processing devices such as a folder, burster, trimmer, stacker, take-up roll, Magnetic Ink Character Recognition (MICR) printer, color printer, etc., that perform post processing operations on the printer output to finish the print job. The printer when processing a print job would print markings for post-processing operations on the print output. The markings may be printed at an inconspicuous location on the print output or in a section that will be removed as a result of the subsequent post-processing operations. The printer stores marking settings that control the dimension and location of a mark specified in the print job. Upon detecting the marking on the print output, the post processing device performs a predefined post processing operation as specified by the marking.

The printer may include marking settings for a specific post processing device. However, if new post-processing devices are attached to the printer, the printer marking settings may produce marks that are not recognized by the newly attached post-processing device. The printer developer may have to supply a new printer microcode patch to apply to the printer firmware to modify the marking settings to work with different post-processing devices.

There is a need in the art for improved techniques for generating and delivering updated marking settings to enable the printer to integrate with different post-processing devices.

SUMMARY

Provided are a method, system, and program generating user defined marking settings to print marks to control post-processing devices. A user interface is generated to enable user input to define at least one marking setting comprising a name of the marking setting, a dimension of a marking, and a location of the marking on the print medium. Marking settings control a printer to output markings on a print medium. The outputted markings on the print medium control at least one post processor device to perform post processing operations on the print medium. User input is received from the user interface defining at least one marking setting. The user defined at least one marking setting is stored with an existing set of marking settings to control the printer.

DETAILED DESCRIPTION

Figure 1:
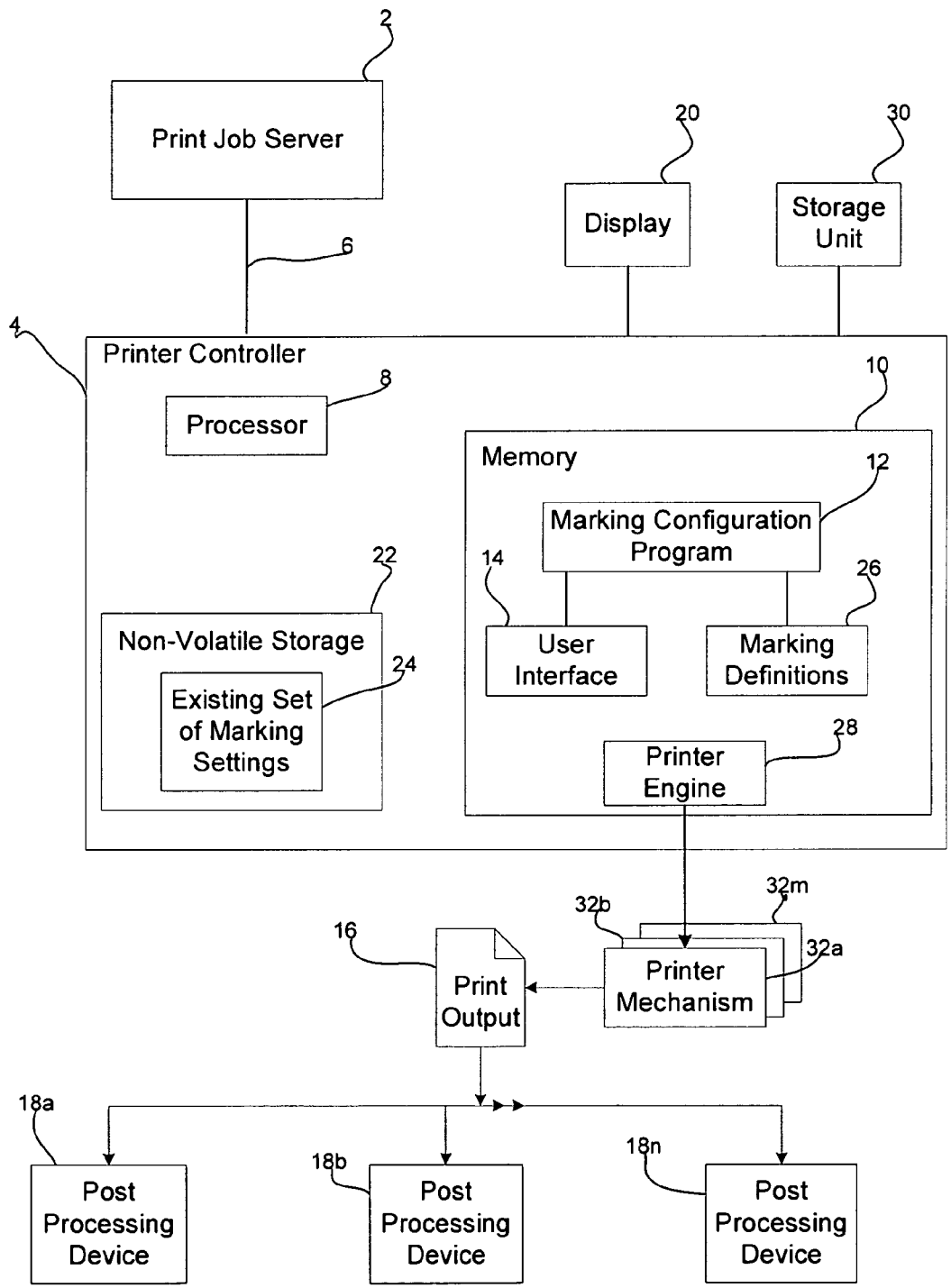
FIG. 1 illustrates an embodiment of a computing environment.

FIG. 1 illustrates a computing environment in which embodiments are implemented. A print job server 2 is in communication with a printer controller 4 over a connection 6 and provides the printer controller 4 with print jobs to render. The printer controller 4 includes a processor 8 and memory 10 including programs executed by the processor 8. The memory 10 includes a marking configuration program 12 that generates a user interface 14 to enable a user to modify, edit and create markings used by the printer controller 4. The print job server 2 submits a print job generated at clients (not shown) to the printer controller 4. The printer controller 4 may print the markings as specified by the existing set of markings 24 on print output 16 comprising a print medium, e.g., paper, cards, etc., to control one or more post processing devices 18a, 18b . . . 18n to perform post processing operations on the print output 16. The print output 16 may be provided to one or more of the post processing devices 18a, 18b . . . 18n. The post processing devices 18a, 18b . . . 18n may comprise a folder, burster, trimmer, stacker, take-up roll, Magnetic Ink Character Recognition (MICR) printer, color printer, etc. The post processing devices 18a, 18b . . . 18n may be attached to the printer controller 4 through a post processing device interface. Alternatively, a user may have to take the print output 16 and manually input to the post processing device 18a, 18b . . . 18n. The markings printed on the print output 16 control the post processing devices 18a, 18b . . . 18n to perform a specific post processing operation.

Users at client systems in communication with the printer controller 4 may access, the marking configuration 12 program through a web (e.g., embedded web server) or other interface. Alternatively, the marking configuration program 12 may be part of a printer program executed by a client system that provides a user interface to enable the user to configure the printer controller 4. Still further, an administrator may access the marking configuration program 12 at a console at the printer controller 12, where the user interface 14 is displayed on a display 20 attached to the printer controller 4.

The printer controller 4 includes a non-volatile storage 22 to store an existing set of marking settings 24 that control how the printer controller 4 outputs the markings, i.e., the dimension and location of the marking on the print output 16. The marking configuration program 12 generates user defined marking definitions 26. The existing set of marking settings 24 in the printer non-volatile storage 22 may be updated with the user defined marking definitions 26 generated by the marking configuration program 12. The printer controller 4 further includes a printer engine interface 28 to control one or more printer mechanisms 32a, 32b . . . 32n, and other programs to control printer operations, such as rasterizing data, managing print jobs, communicating with network and attached components, communicating with a printer program and the marking configuration program 12, etc. The printer controller 4 further includes printer mechanisms 32a, 32b . . . 32m, which are hardware and mechanical components to perform the printing. In certain embodiments, the marking configuration program 12 may directly access the existing marking settings 24 from the non-volatile storage 22 to edit or update. Alternatively, the marking configuration program 12 may interact with the printer engine interface 28 or other printer controller 4 components or application program interfaces (APIS) to supply marking definitions 26 to the printer controller 4.

In FIG. 1, printer controller 4 components, such as the printer engine interface 28 and marking configuration program 12 are shown as programs loaded into memory 10 and executed by the processor 8. In an alternative embodiment, the printer controller 4 components may be implemented in hardware logic, such as one or more Application Specific Integrated Circuits (ASICs).

A storage unit 30 may be coupled to the printer controller 4. The marking definitions 26 may be stored onto the storage unit 30. An administrator may then connect the storage unit 30 to printers to supply new marking definitions 26 to the printers.

The connection 6 may comprise a cable providing a direct connection or a network connection, such as a Local Area Network (LAN), Storage Area Network (SAN), Wide Area Network (WAN), wireless network, peer-to-peer network, etc. The non-volatile storage 22 and storage unit 30 may comprise non-volatile storage device known in the art, such as a non-volatile electronic memory (e.g., Flash Disk), hard disk drive, portable magnetic disk drive, optical disk or storage, tape, etc. The printer mechanisms 32a, 32b . . . 32m may comprise a printer, plotter, three dimensional model builder or other similar output device known in the art.

Figure 2:
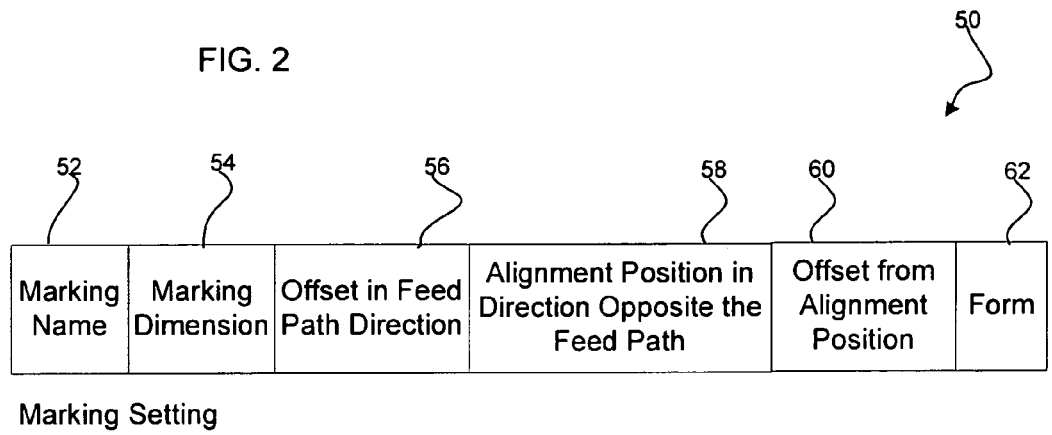
FIG. 2 illustrates an embodiment of marking setting information.

FIG. 2 illustrates an embodiment of a user editable marking setting 50, where the marking definitions 26 include one or marking settings 50. A marking setting 50 that may be created, modified or deleted by the marking configuration program 12 includes: a name 52, which may be a descriptive name of the marking; a marking dimension 54 providing the size dimensions of the marking that the printer controller 4 outputs; an offset in the feed path direction 56 where the marking is located; an alignment position on the paper in the direction perpendicular to the feed path direction 58; an offset from the alignment position 60; and a form 62 to which the marking setting applies. If the form field 62 is empty, then the marking setting 50 applies to any form. In the described embodiments, the marking location is defined relative to the size of the paper and may thus apply to different paper sizes. The form 62 may comprise any collection of printer settings. Such settings may include form height, width, tractorless (yes/no) and may also include settings such as contrast, boldness, fuser temperature, etc. The form 62 settings allow the user to configure settings that pertain to both a form and a job, so the settings are not limited to just one particular form.

In one embodiment, the user interface 14 may comprise a graphical user interface (GUI) having panels, windows, fields and other selectable graphical controls in which the user may enter the information 52-62 for the marking setting 50. The marking configuration program 12 may convert the user entered information into marking definition 26 code or language that is understood by the printer controller 4. In an alternative embodiment, the user interface 14 may comprise a text editor or other program that the user controls to edit a file including editable marking settings. The editable marking settings may comprise entries in the file. The user interface 14 may add entries having editable fields for the marking setting information 52-62 that the user may modify through the user interface 14, e.g., editor. Upon editing the marking setting entries 50 in the text files, the user may then provide the file or marking settings therein to the printer controller 4 to add to or replace the existing set of marking settings 24. The file may have entries for predefined marking names recognized by the printer controller 4 that the user may edit or the user may add new marking names for new post-processing devices.

In certain embodiments, the marking setting 50 includes two location components, an offset from an edge in the feed path direction 76, as expressed in field 56, and an offset from an alignment position in the direction perpendicular to the feed path direction 74, as expressed in fields 58 and 60. In certain embodiments, the user may select from multiple alignment positions that define positions in the feed direction.

Figure 3:
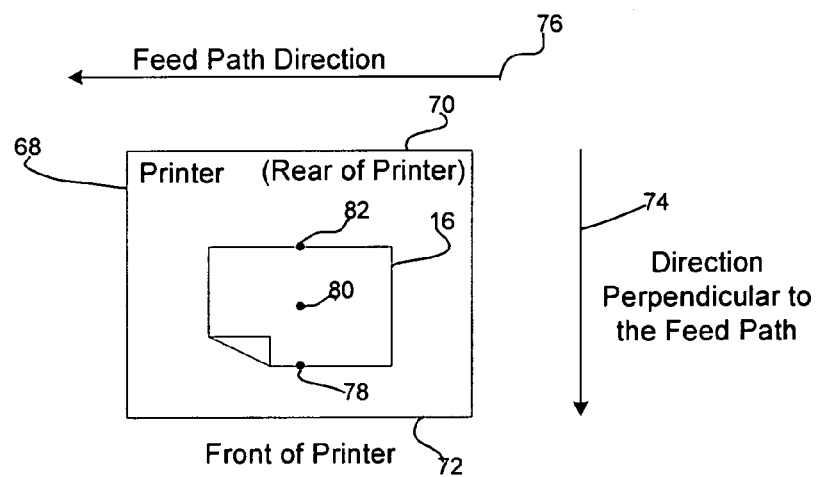
FIG. 3 illustrates an orientation of print output being outputted by a printer and markings on the print output.

FIG. 3 illustrates how location may be indicated with respect to the print output 16 and a printer 68 orientation with respect to a rear 70 and front 72 of the printer 68. The printer 68 comprises the "box" or housing of the printer controller 4 and printer mechanism(s) 32a, 32b . . . 32m that outputs the print output 16. The print output 16 exits the printer 68 in the feed path direction 76. In one embodiment, the paper flows from the left to the right as shown by the feed path direction 76. A direction perpendicular to the feed path 74 extends from the rear 70 to the front 72 of the printer.

FIG. 3 illustrates three alignment positions 78, 80, and 82 in the direction perpendicular to the feed path direction 74, a front alignment position 78 at the front of the printer 72, a center alignment position 80 at the center of the paper (print output 16), and a rear alignment position 82 at the rear of the printer 70. Thus, to specify the position of the marking in the direction perpendicular to the feed path direction 74, the user specifies the alignment position 78, 80, and 82 and the offset from that alignment point.

In one embodiment, the alignment position further indicates the alignment of the mark at the location, such that a front alignment position 78 with an offset of zero places the left edge of the marking on the edge of the print output 16 at the front of the printer 72, a center alignment point 80 with an offset of zero places the center of the marking at the center of the print output 16, and a rear alignment position 80 with an offset of zero places the right edge of the marking on the edge of the print output 16 at the rear of the printer 70. Thus, the alignment point 78, 80, and 82 indicates a position in the direction perpendicular to the path direction 74 and how to align the mark with respect to that position.

Figure 4:
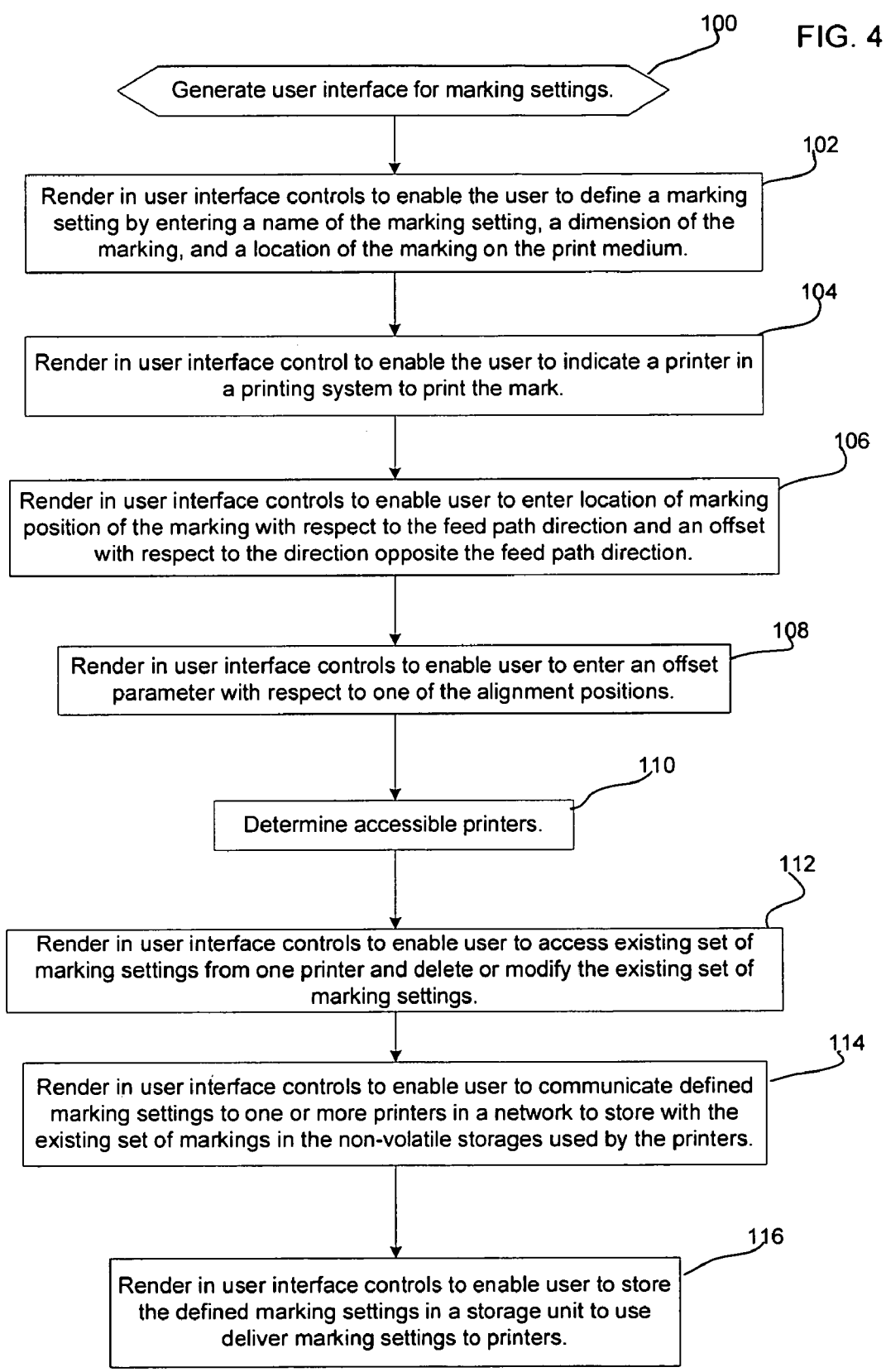
FIGS. 4 and 5 illustrate an embodiment of operations to allow a user to edit and create marking settings.

FIG. 4 illustrates an embodiment of operations performed by the marking configuration program 12 to generate the user interface 14 in which the user may enter information for a marking definition 26 and deliver the marking definition 26 to the printer controller 4. Each of the operations illustrated in FIG. 4 may be invoked through user selection of menu items and other elements rendered in panels and windows of the user interface 14. Upon generating (at block 100) the user interface 14, the marking configuration program 12 may render (at block 102) in the user interface 14 controls to enable the user to define a marking setting 50 by entering a name of the marking setting 52, a dimension of the marking 54, and a location of the marking on the print medium 56, 58, and 60. The user may select a name from a list of predefined marking names recognized by the printer controller 4 so that the user may specify the marking dimension and location for the recognized marking name. Further, the name may comprise a name of a post-processing operation the printer controller 4 recognizes. Alternatively, the name 52 may comprise a user created name. The marking configuration program 12 may further render (at block 104) in the user interface 14 controls to enable the user to indicate in the marking setting 50 one of a plurality of printer mechanisms in a printing system to print the mark. For instance, if the user wants the mark printed on both sides of the page in a duplex system, the user would enable both front and back printers to print the mark. If the printer is printing color and the user wants the mark in black, the user would designate in the marking setting 50 that the mark be enabled for the printer which is printer printing black and the mark be disabled for the printers printing the non-black colors. The marking configuration program 12 may further render (at block 106) in the user interface 14 controls to enable the user to enter a location of the marking with respect to the feed path direction 56 and an offset with respect to the direction perpendicular to the feed path 58 and 60. To enable the user to enter the location with respect to the direction perpendicular to the feed path direction 74, the user interface 14 may render (at block 108) controls to enable the user to enter an offset parameter 60 with respect to one of the alignment positions 58.

In an additional embodiment where the marking configuration program 12 is in a system separate from the printer controller 4 or is within the printer controller 4 (as shown in FIG. 1) and is also capable of communicating with other printers in a network, then the marking configuration program 12 may additionally perform the operations at blocks 110 through 116 for network related operations. At block 110, the marking configuration program 12 may determine (at block 110) other accessible printers. Accessible printers may comprise printers to which the computer 2 executing the marking configuration program. 12 are connected directly or through a network or other connection, or printers that are not connected, but for which the marking settings 50 are being generated. If the available printers are accessible over a connection 6, then the marking configuration program 12 may determine available network printers using network or other protocols. The marking configuration program 12 may further render (at block 112) in the user interface 14 controls to enable the user to access an existing set of marking settings 24 in the non-volatile storage 22 used by a different printer and delete or modify the local existing set of marking settings 24. In the embodiment where the marking configuration 12 is located within the printer controller 4, the marking configuration program 12 may further delete or modify the existing marking settings 24 within the printer controller 4 housing the marking configuration program 12. The marking configuration program 12 may further render (at block 114) in the user interface 14 controls to enable the user to communicate defined marking settings 50 to one or more printers in a network to store with the existing set of markings 24 in the non-volatile storages 22 used by the printers. User defined marking definitions 26 from other printers may be transmitted over a connection 6, e.g., network or cable, to the printer controller 4, and the printer controller 4 may update the existing set of marking settings 24 with marking definitions 26 supplied by the marking configuration program 12. Additionally, the marking configuration program 12 may further render (at block 116) in the user interface 14 controls to enable the user to store the defined marking settings in the storage unit 30 and then deliver, from the storage unit 30, marking settings to accessible printers. The user may then take the storage unit 30 to interface with different printers to supply the printers with updated marking definitions or an entirely new updated set of marking settings. In this way, the user may create a single set of marking definitions 26 that may be delivered to multiple printers to use to control how the printer renders the markings on the print output 16.

Figure 5:
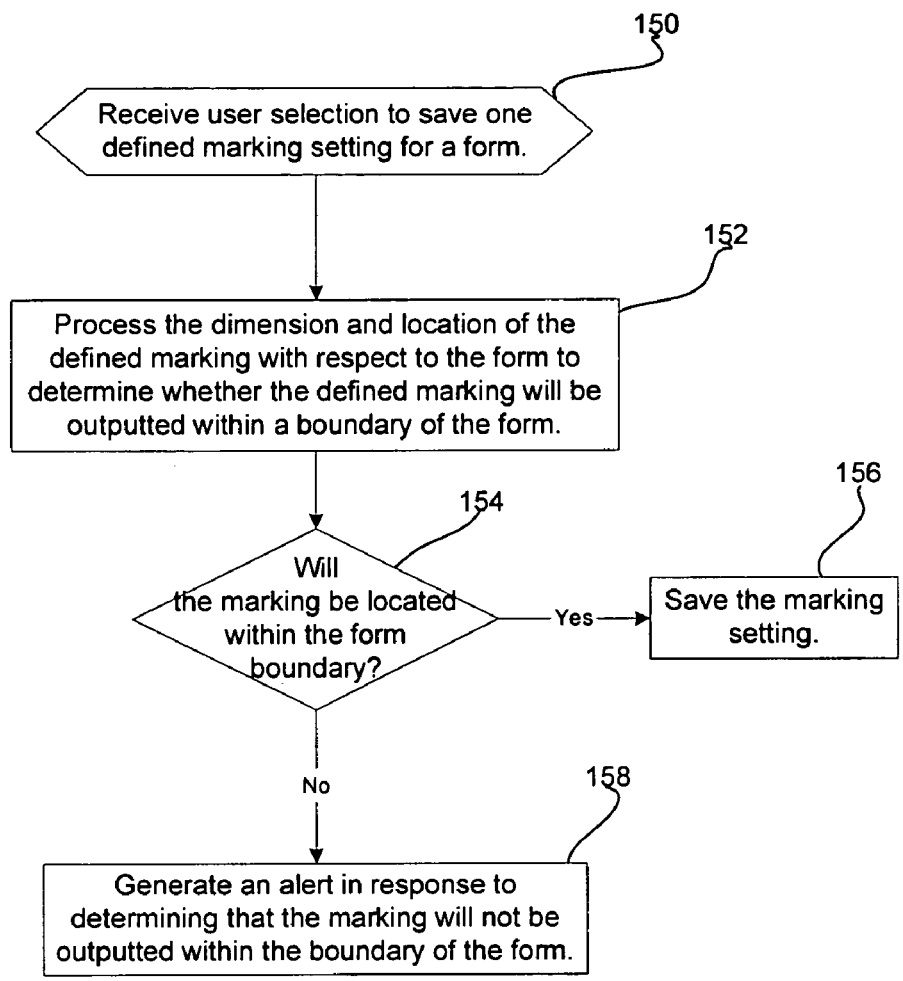

FIG. 5 illustrates an embodiment of operations performed by the marking configuration program 12 to verify a user defined marking upon receiving (at block 150) user selection to save one defined marking setting for a form having a particular paper size. In response, the marking configuration program 12 processes (at block 152) the dimension 54 and location 56, 58, and 60 of the defined marking with respect to the form dimensions to determine whether the defined marking will be outputted within a boundary of the form. If (at block 154) the marking fits within the form boundary, then the user defined marking is saved (at block 156). Otherwise, if the user defined marking does not fit within the bounds of the form, then the marking configuration program 12 generates (at block 158) an alert to the user that the marking will not be outputted within the boundary of the form.

Described embodiments provide techniques for a user to modify and add marking settings to a printer that controls how the printer outputs markings to control post-processing devices to perform post processing operations on print output. Described embodiments provide a user interface through which a user may configure the dimension and location of markings generated on the print output. In this way, the user may optimize the location and dimension of the markings for particular post-processing devices that will process the print output.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. Of course, those skilled in the art will recognize that many modifications may be made to this configuration without departing from the scope of the present invention, and that the article of manufacture may comprise suitable information bearing medium known in the art.

In the described embodiment, the marking settings provided one offset 56 in the direction of the feed path 76 and an alignment position 58 and offset 60 for the alignment position for the direction perpendicular to the feed path direction 74. In an alternative embodiment, the offset 56 may be provided for the direction perpendicular to the feed path and the alignment position 58 and offset 60 may be provided for the feed path direction. Thus, the offset 56 may be provided for a first direction with respect to a feed path direction and the alignment position 58 and offset 60 may be provided for a second direction with respect to the feed path direction, where the first direction and the second direction can either be in the feed path or perpendicular to the feed path directions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

FIG. 2 shows information maintained in a certain format. In alternative embodiments, the information shown in FIG. 2 may be maintained in alternative data structures and formats, and in different combinations.

The illustrated operations of FIGS. 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture including code that causes operations to be performed, the operations comprising: generating a user interface to receive user input defining at least one marking setting to control a printer output of markings on a print medium; receiving marking definition code including user input from the user interface defining a first marking setting providing marking definitions to instruct the printer to output a first set of markings on the print medium to control post processing operations on the print medium performed by a first post processor device, the first marking setting comprising a name of the marking setting, a dimension of a marking, a location of the marking on the print medium and a form to which the first marking setting applies; processing the dimension and location of the first defined marking with respect to the form to determine whether the defined marking will be outputted within a boundary of the form; generating an alert in response to determining that the marking will not be outputted within the boundary of the form; and storing the first marking setting with existing marking settings in response to determining that the marking will be outputted within the boundary of the form; wherein the dimension of the marking includes a width and height of the marking and wherein the location of the marking comprises a position of the marking with respect to an edge of the print medium in a first direction with respect to a feed path direction and an offset with respect to the first direction; and wherein the user interface enables the user to set the offset of the mark with respect to a second direction with respect to the feed path direction by indicating one of a plurality of alignment positions on the print medium in the second direction and an offset parameter with respect to the indicated alignment position, wherein the offset with respect to the second direction causes the output of the mark at different locations on print media having different dimensions with respect to the second direction.

2. The article of manufacture of claim 1, wherein the user interface enables the user to indicate one of a plurality of printer mechanisms in a printing system having multiple printer mechanisms to print the mark according to the marking settings.

3. The article of manufacture of claim 1, wherein the first direction comprises the feed path direction and wherein the second direction comprises a direction perpendicular to the feed path direction.

4. The article of manufacture of claim 1, wherein the alignment positions include positions on the print medium at a first edge of the print medium closest to a rear of the printer, at a center of the print medium, and at a second edge of the print medium closest to a front of the printer.

5. The article of manufacture of claim 1, wherein the code further causes operation comprising:
   receiving, through the user interface, user input to delete or modify the existing set of marking settings.

6. The article of manufacture of claim 1, wherein the code further causes operation comprising:
   receiving, through the user interface, user selection to communicate the first marking setting to a plurality of printers in a network environment to store with the existing set of markings in the non-volatile storages used by the printers.

7. The article of manufacture of claim 1, wherein the code further causes operation comprising:

receiving, through the user interface, user selection to store the first marking setting to a storage unit external to the printers to which the first defined marking setting will be delivered; and coupling the storage unit to at least one printer to communicate first marking setting in the storage unit to the non-volatile storage of the printer to which the storage unit is coupled.

8. A method, comprising: generating a user interface to receive user input defining at least one marking setting to control a printer output of markings on a print medium; receiving marking definition code including user input from the user interface defining a first marking setting providing marking definitions to instruct the printer to output a first set of markings on the print medium to control post processing operations on the print medium performed by a first post processor device, the first marking setting comprising a name of the marking setting, a dimension of a marking, a location of the marking on the print medium and a form to which the first marking setting applies; processing the dimension and location of the first defined marking with respect to the form to determine whether the defined marking will be outputted within a boundary of the form; generating an alert in response to determining that the marking will not be outputted within the boundary of the form; and storing the first marking setting with existing marking settings in response to determining that the marking will be outputted within the boundary of the form; wherein the dimension of the marking includes a width and height of the marking and wherein the location of the marking comprises a position of the marking with respect to an edge of the print medium in a first direction with respect to a feed path direction and an offset with respect to the first direction; and wherein the user interface enables the user to set the offset of the mark with respect to a second direction with respect to the feed path direction by indicating one of a plurality of alignment positions on the print medium in the second direction and an offset parameter with respect to the indicated alignment position, wherein the offset with respect to the second direction causes the output of the mark at different locations on print media having different dimensions with respect to the second direction.

9. The method of claim 8, wherein the user interface enables the user to indicate one of a plurality of printer mechanisms in a printing system having multiple printer mechanisms to print the mark according to the marking settings.

10. A system comprising: a printer controller; a printer mechanism in communication with the printer controller; a storage including an existing set of marking settings to control the printer mechanism to output markings on a print medium, wherein the outputted markings control at least one post processor device to perform post processing operations on the print medium; and a computer readable medium including code executed by the printer controller to cause operations to be performed, the operations comprising: a user interface generated by the printer controller to receive user input defining at least one marking setting, wherein marking settings control the printer mechanism to output markings on the print medium; and receiving marking definition code including user input from the user interface defining a first marking setting providing marking definitions to instruct the printer to output a first set of markings on the print medium to control post processing operations on the print medium performed by a first post processor device, the first marking setting comprising a name of the marking setting, a dimension of a marking, and a location of the marking on the print medium and a form to which the first marking setting applies; processing the dimension and location of the first defined marking with respect to the form to determine whether the defined marking will be outputted within a boundary of the form; generating an alert in response to determining that the marking will not be outputted within the boundary of the form; and storing the first marking setting with existing marking settings in response to determining that the marking will be outputted within the boundary of the form; wherein the dimension of the marking includes a width and height of the marking and wherein the location of the marking comprises a position of the marking with respect to an edge of the print medium in a first direction with respect to a feed path direction and an offset with respect to the first direction; and wherein the user interface enables the user to set the offset of the mark with respect to a second direction with respect to the feed path direction by indicating one of a plurality of alignment positions on the print medium in the second direction and an offset parameter with respect to the indicated alignment position, wherein the offset with respect to the second direction causes the output of the mark at different locations on print media having different dimensions with respect to the second direction.

* * * * *

UNITED STATES PATENT AND TRADEMARK OFFICE
CERTIFICATE OF CORRECTION

PATENT NO.        : 8,279,457 B2                                              Page 1 of 1
APPLICATION NO.   : 11/228075
DATED             : October 2, 2012
INVENTOR(S)       : Hopper et al.

It is certified that error appears in the above-identified patent and that said Letters Patent is hereby corrected as shown below:

In column 8, claim 1 at line 39 delete, "haying" and insert --having--.

In column 9, claim 8 at line 40 delete, "haying" and insert --having--.

In column 10, claim 10 at line 42 delete, "haying" and insert --having--.

Signed and Sealed this
Twenty-fifth Day of December, 2012

David J. Kappos
*Director of the United States Patent and Trademark Office*